US006647502B1

(12) United States Patent
Ohmori

(10) Patent No.: US 6,647,502 B1
(45) Date of Patent: Nov. 11, 2003

(54) METHOD AND APPARATUS FOR PROVIDING POWER BASED ON THE AMOUNT OF DATA STORED IN BUFFERS

(75) Inventor: Mutsuhiro Ohmori, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/352,384

(22) Filed: Jul. 13, 1999

(51) Int. Cl.$^7$ .................................................. G06F 1/32
(52) U.S. Cl. ...................... 713/322; 713/320; 713/600; 710/57
(58) Field of Search ................................ 713/300–340, 713/600–601; 710/52–61

(56) References Cited

U.S. PATENT DOCUMENTS

| | | | | |
|---|---|---|---|---|
| 4,270,183 A | * | 5/1981 | Robinson et al. ............. | 710/57 |
| 4,288,860 A | * | 9/1981 | Trost .......................... | 711/167 |
| 4,890,254 A | * | 12/1989 | Cooley ........................ | 710/57 |
| 4,907,186 A | * | 3/1990 | Racey ......................... | 370/476 |
| 5,033,064 A | * | 7/1991 | Upp ............................ | 375/372 |
| 5,070,443 A | * | 12/1991 | Priem et al. ................ | 710/105 |
| 5,367,638 A | * | 11/1994 | Niessen et al. .............. | 710/57 |
| 5,592,658 A | * | 1/1997 | Noam .......................... | 713/503 |
| 5,692,201 A | * | 11/1997 | Yato ............................ | 713/322 |
| 5,778,218 A | * | 7/1998 | Gulick ........................ | 713/503 |
| 5,778,237 A | * | 7/1998 | Yamamoto et al. ......... | 713/322 |
| 5,778,420 A | * | 7/1998 | Shitara et al. .............. | 711/113 |
| 5,787,294 A | * | 7/1998 | Evoy ........................... | 713/320 |
| 5,872,823 A | * | 2/1999 | Sutton ......................... | 375/372 |
| 5,958,027 A | * | 9/1999 | Gulick ......................... | 710/52 |
| 6,141,762 A | * | 10/2000 | Nicol et al. ................. | 713/300 |
| 6,247,072 B1 | * | 6/2001 | Firestone .................... | 710/53 |
| 6,279,058 B1 | * | 8/2001 | Gulick ......................... | 710/58 |

FOREIGN PATENT DOCUMENTS

JP     Hei 10-187300     7/1998

* cited by examiner

*Primary Examiner*—Sumati Lefkowitz
(74) *Attorney, Agent, or Firm*—Fulwider Patton Lee & Utecht, LLP

(57) ABSTRACT

A power supply controlling circuit by which further reduction of power consumption in a circuit can be achieved includes a clock controller. The clock controller detects a processing state of a module based on an amount of data stored in a FIFO memory. For example, when the load to the module is not very high, the clock controller continuously lowers the frequency of a system clock signal to be supplied to the module and continuously lowers the power supply voltage to the module.

9 Claims, 5 Drawing Sheets

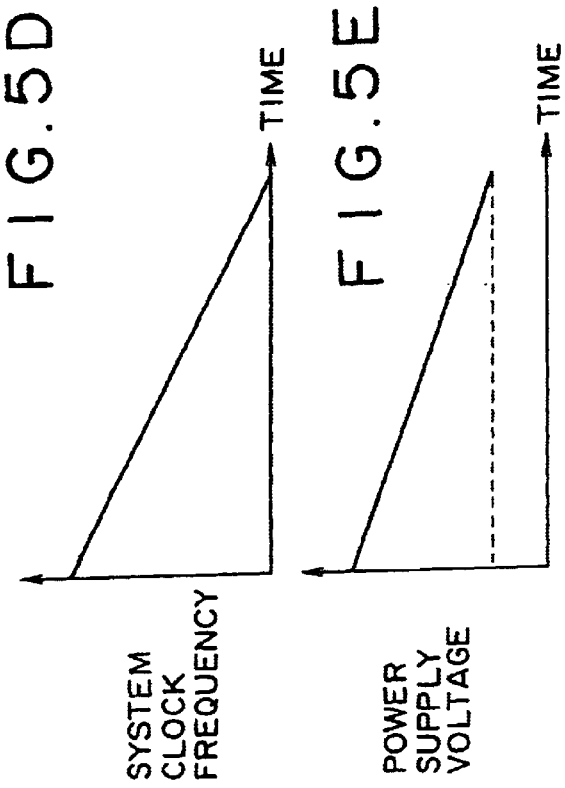
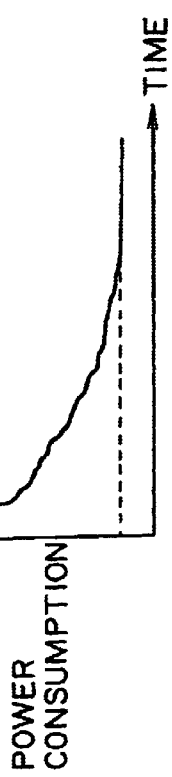
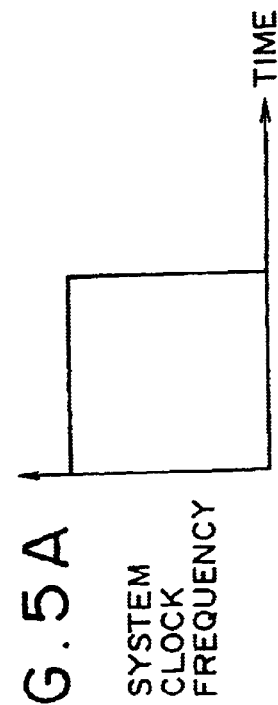
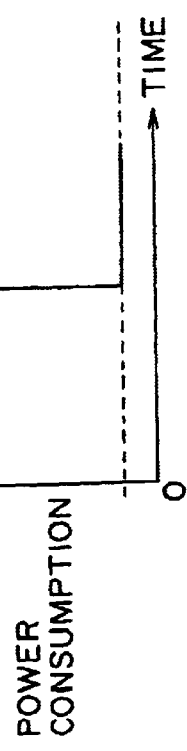

METHOD AND APPARATUS FOR PROVIDING POWER BASED ON THE AMOUNT OF DATA STORED IN BUFFERS

BACKGROUND OF THE INVENTION

This invention relates to a power supply controlling circuit and a power supply controlling method, and more particularly to a power supply controlling circuit and a power supply controlling method wherein the frequency of a system clock signal and the power supply voltage to be supplied to a module which forms, for example, a one-chip semiconductor circuit or a like circuit can be continuously varied to reduce the power consumption of the module.

FIG. 6 shows a construction of an example of a conventional semiconductor circuit.

Referring to FIG. 6, the semiconductor circuit shown includes a buffer 2, a pair of modules 4 and 6, a controller 21 and a pair of AND gates 22 and 23, which are all included in one chip, and performs predetermined processing in accordance with a system clock signal generated by an external clock generator 1.

In particular, the clock generator 1 generates a clock signal of a predetermined fixed frequency. This clock signal is supplied as a system clock signal to the module 4 through the buffer 2 and the AND gate 22 and also to the module 6 through the buffer 2 and the AND gate 23.

The module 4 receives data supplied thereto from the outside, and performs predetermined processing in synchronism with the system clock signal supplied through the AND gate 22 and outputs data of a result of the processing to the module 6. The module 6 performs predetermined processing for the data outputted from the module 4 in synchronism with the system clock signal supplied thereto through the AND gate 23 and outputs data obtained as a result of the processing, similarly to the module 4.

Meanwhile, the controller 21 receives a control signal (application control signal) for controlling on/off of supply of the system clock signal to the modules 4 and 6. The control signal is supplied from a predetermined application (which may be any of hardware and software) The controller 21 outputs the L or H levels to the AND gates 22 and 23 in accordance with the control signal.

In particular, the controller 21 normally outputs the H level to the AND gates 22 and 23 so that the system clock signal is supplied to the modules 4 and 6 through the AND gates 22 and 23, respectively. Meanwhile, for example, on the application side, a processing state of the module 6 which is the following stage one of the modules 4 and 6 is predicted or detected by some method, and if data to be processed has not arrived at the module 6, then a control signal indicating that supply of the clock signal to the module 6 should be stopped is supplied to the controller 21. In this instance, the controller 21 outputs the L level to the AND gate 23, and consequently, supply of the system clock signal to the module 6 is stopped.

Thereafter, if it is detected by the application side that data is inputted to the module 6, then a control signal indicating that supply of the clock signal to the module 6 should be started is supplied to the controller 21. In response to the control signal, the controller 21 outputs the H level to the AND gate 23, and consequently, supply of the system clock signal to the module 6 is started.

Also with regard to supply of the clock signal to the module 4, on/off control similar to that to the module 6 is performed by varying the input level to the AND gate 22.

Where such on/off control of supply of the system clock signal as described above is performed, the modules do not operate while supply of the system clock signals to them in off. Consequently, the power consumption of the semiconductor circuit can be reduced when compared with an alternative case wherein the system clock signal is supplied incessantly.

However, it is demanded in recent years to further reduce the power consumption of a semiconductor circuit.

SUMMARY OF THE INVENTION

It is an object of the present invention to provide a power supply controlling circuit and a power supply controlling method by which further reduction of the power consumption can be achieved.

In order to attain the object described above, according to an aspect of the present invention, there is provided a power supply controlling circuit for controlling a power supply voltage to be supplied to a module which performs predetermined processing in synchronism with a predetermined system clock signal, comprising detection means for detecting a processing state of the module and control means for continuously varying the frequency of the system clock signal and the power supply voltage in response to a result of the detection of the detection means.

In the power supply controlling circuit, the detection means detects a processing state of the module, and the control means continuously varies the frequency of the system clock signal and the power supply voltage in response to a result of the detection of the detection means.

According to another aspect of the present invention, there is provided a power supply controlling method for controlling a power supply voltage to be supplied to a module which performs predetermined processing in synchronism with a predetermined system clock signal, comprising the steps of detecting a processing state of the module, and continuously varying the frequency of the system clock signal and the power supply voltage in response to a result of the detection of the processing state of the module.

In the power supply controlling method, a processing state of the module is detected, and the frequency of the system clock signal and the power supply voltage are continuously varied in response to a result of the detection of the detection means.

With the power supply controlling apparatus and the power supply controlling method, a processing state of the module is detected, and the frequency of the system clock signal and the power supply voltage are continuously varied in response to a result of the detection of the detection means. Accordingly, the power consumption of the module can be controlled lower than ever.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIGS. 5A to 5F are diagrams illustrating variations of the frequency of the system clock signal, the power supply voltage and the power consumption with respect to time when the loads to modules shown in FIG. 1 and FIG. 6 gradually decrease.

DESCRIPTION OF THE PREFERRED EMBODIMENT

Figure 1:
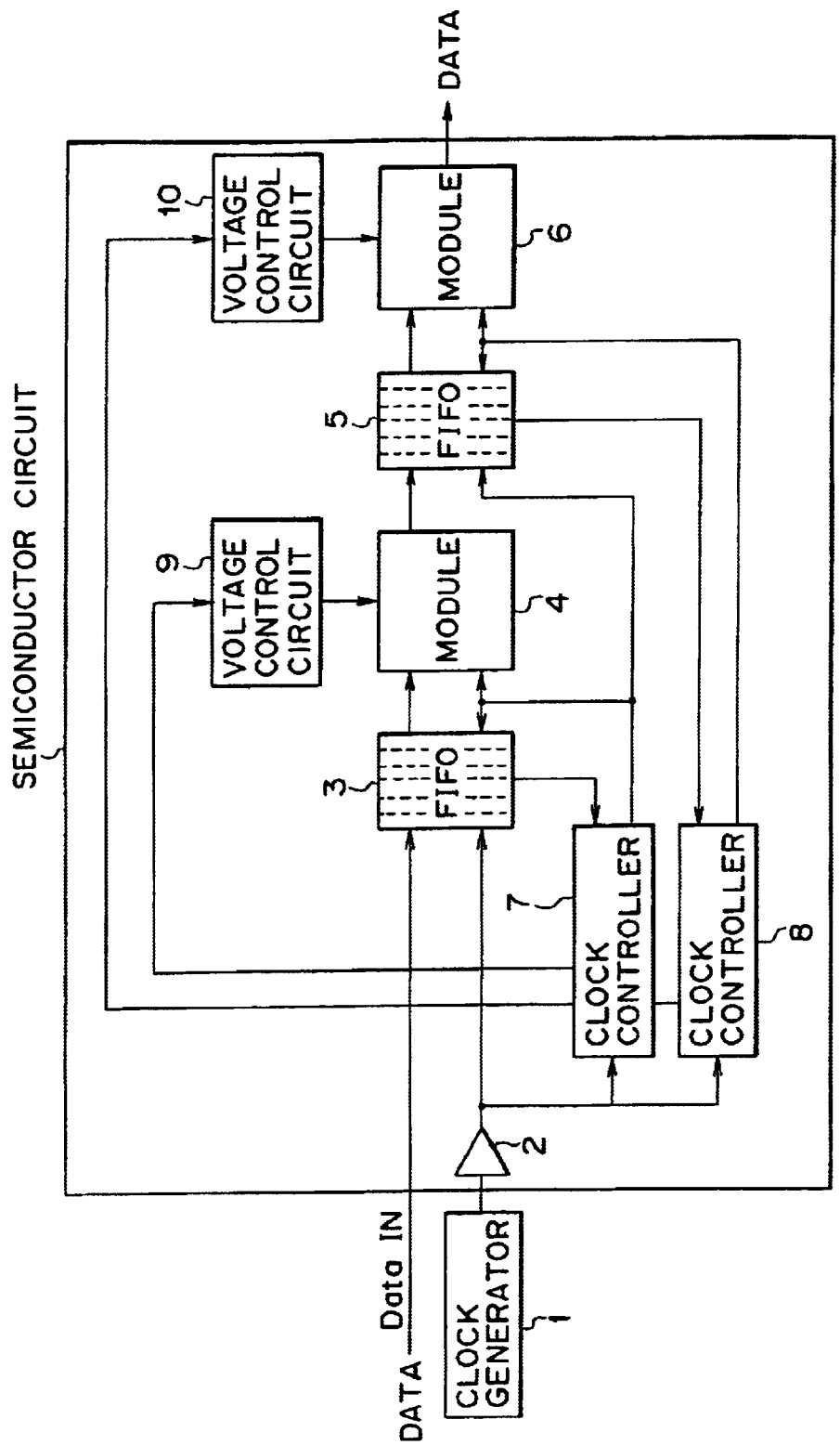
FIG. 1 is a block diagram showing a construction of a semiconductor circuit to which the present invention is applied.

In FIG. 1, there is shown a construction of a semiconductor circuit to which the present invention is applied. The semiconductor circuit is basically similar to but is different from the conventional semiconductor circuit described hereinabove with reference to FIG. 6 in that it eliminates the AND gates 22 and 23 and includes a pair of clock controllers 7 and 8 in place of the controller 21 and it additionally includes a pair of FIFO (First-In First-Out) memories 3 and 5 and a pair of voltage control circuits 9 and 10.

The FIFO memory 3 or 5 is provided in a stage preceding to the module 4 or 6. Here, an input stage and an output stage of each of the FIFO memories 3 and 5 operate in synchronism with different clock signals from each other (asynchronously).

In particular, a clock signal is supplied to the input stage of the FIFO memory 3 from the clock generator 1 through the buffer 2, and the FIFO memory 3 stores data in synchronism with the clock signal. Another clock signal outputted from the clock controller 7 is supplied to the output stage of the FIFO memory 3, and data are read out from the FIFO memory 3 in synchronism with the clock signal.

It is to be noted that the clock signal outputted from the clock controller 7 is supplied not only to the output stage of the FIFO memory 3 but also to the module 4. Accordingly, reading out of data from the FIFO memory 3 is performed in synchronism with the timing of operation of the module 4. Further, the clock signal outputted from the clock controller 7 is supplied also to the input stage of the FIFO memory 5. Accordingly, also writing of data into the FIFO memory 5 is performed in synchronism with the timing of operation of the module 4.

Further, a clock signal outputted from the clock controller 8 is supplied to the output stage of the FIFO memory 5, and reading out of data from the FIFO memory 5 is performed in synchronism with the clock signal. It is to be noted that the clock signal outputted from the clock controller 8 is supplied not only to the output stage of the FIFO memory 5 but also to the module 6. Accordingly, reading out of data from the FIFO memory 5 is performed in synchronism with the timing of operation of the module 6.

Further, each of the FIFO memories 3 and 5 outputs, if the amount of data stored therein becomes smaller than ½ the storage capacity of it, a half empty flag representing the fact, but outputs, if the stored data amount becomes so great that it is estimated that an overflow may occur, an almost full flag representing the fact, to the clock controller 7 or 8.

The clock controllers 7 and 8 detect processing states of the modules 4 and 6 based on flags supplied thereto from the FIFO memories 3 and 5 and control the frequencies of the clock signals to be supplied to the FIFO memory 3, module 4, FIFO memory 5 and module 6 in response to results of the detection, respectively. Further, the clock controller 7 or 8 controls the voltage control circuit 9 or 10 in response to the detection of the processing state of the module 4 or 6.

The voltage control circuit 9 or 10 controls the power supply voltage to be supplied to the module 4 or 6 under the control of the clock controller 7 or 8.

In the semiconductor circuit having the construction described above, the clock signal generated from the clock generator 1 is supplied as a system clock signal to the input stage of the FIFO memory 3 and the clock controllers 7 and 8 through the buffer 2. The clock controller 7 produces a clock signal of the predetermined frequency from the clock signal supplied thereto through the buffer 2 and supplies the thus produced clock signal as a system clock signal to the output stage of the FIFO memory 3, the module 4, and the input stage or the FIFO memory 5. Similarly, also the clock controller 8 produces a clock signal of another predetermined frequency from the clock signal supplied thereto through the buffer 2 and supplies the thus produced clock signal as a system clock signal to the output stage of the FIFO memory 5 and the module 6.

Into the FIFO memory 3, data supplied from the outside are stored in synchronism with the system clock signal supplied to the input stage thereof. Further, already stored data are read out from the FIFO memory 3 in synchronism with the system clock signal supplied to the output stage of the FIFO memory 3. The data thus read out are supplied to the module 4. The module 4 processes the data read out from the FIFO memory 3 in synchronism with the system clock signal same as the system clock signal supplied to the output stage of the FIFO memory 3. Then, data obtained as a result of the processing are supplied to the FIFO memory 5.

Into the FIFO memory 5, the data from the module 4 are successively stored at timings of the system clock signal with which the module 4 is synchronized. Meanwhile, data stored already in the FIFO memory 5 are successively read out in response to the system clock signal supplied to the output stage of the FIFO memory 5. The data are supplied to the module 6. The module 6 processes the data read out from the FIFO memory 5 in synchronism with the system clock signal same as the system clock signal supplied to the output stage of the FIFO memory 5, and outputs the processed data.

Thus, the data processed in such a manner as described above by the modules 4 and 6 are outputted from the semiconductor circuit.

Meanwhile, the clock controller 7 detects a processing state of the module 4 based on a flag from the FIFO memory 3. When the amount of data stored in the FIFO memory 3 is great or small, the clock controller 7 recognizes that the load applied to the module 4 is high or low, and controls the frequency of the clock signal to be supplied to the output stage of the FIFO memory 3, the module 4 and the input stage of the FIFO memory 5 in accordance with the recognition. Further, the clock controller 7 also controls the voltage control circuit 9 in response to the magnitude of the load to the module 4 to control the power supply voltage to be supplied to the module 4.

More particularly, when the load to the module 4 is high, that is, when it is necessary to raise the speed of operation of the module 4, the clock controller 7 continuously (or gradually) raises the frequency of the system clock signal to be outputted from the clock controller 7 and controls the voltage control circuit 9 to continuously raise also the power supply voltage to be supplied to the module 4. On the other hand, when the load to the module 4 is low, that is, when the speed of operation of the module 4 may be lower, the clock controller 7 continuously reduces the frequency of the system clock signal to be outputted therefrom and controls the voltage control circuit 9 to continuously reduce also the power supply voltage to be supplied to the module 4.

Also the clock controller 8 similarly detects the magnitude of the load to the module 6 based on a flag from the FIFO memory 5 and controls the frequency of the clock signal to be supplied to the output stage of the FIFO memory 5 and the module 6 and the power supply voltage to be supplied to the module 6 in accordance with a result of the detection.

Figure 2:
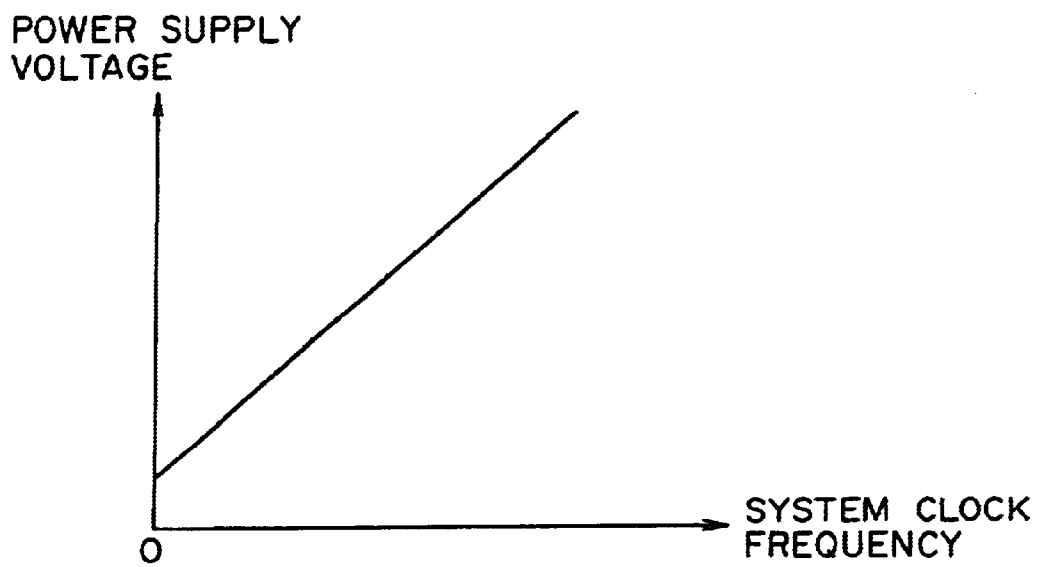
FIG. 2 is a diagram illustrating the frequency of a system clock signal and the power supply voltage which are controlled by clock controllers shown in FIG. 1.

FIG. 2 illustrates a relationship between the frequency of the system clock signal supplied to the module 4 or 6 and the power supply voltage.

As seen from FIG. 2, the power supply voltage lowers as the frequency of the system clock signal lowers. On the other hand, as the power supply voltage rises, also the frequency of the system clock signal rises.

Figure 3:
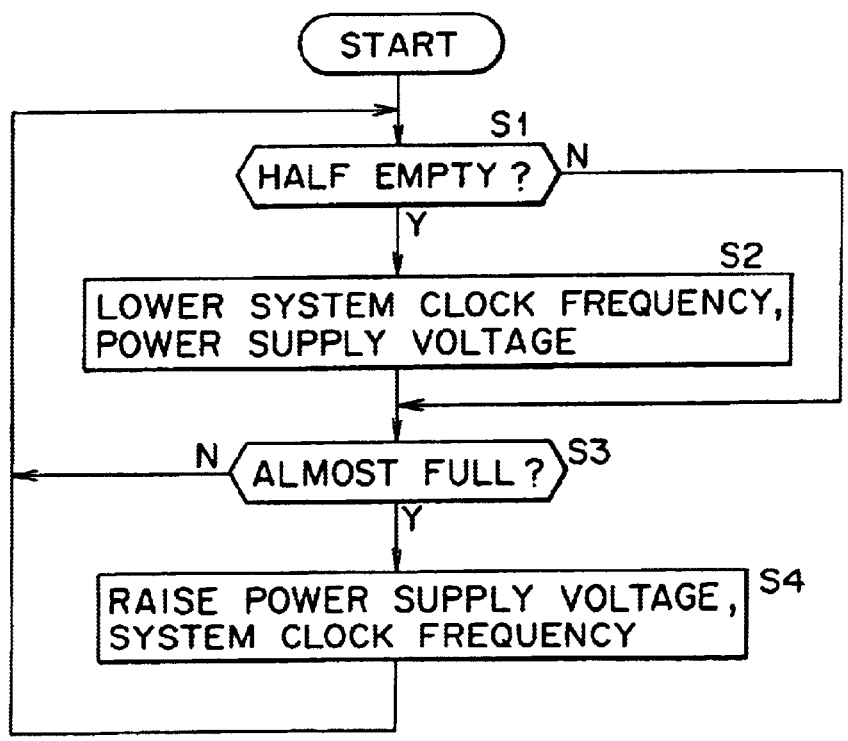
FIG. 3 is a flow chart illustrating controlling processing for the frequency of the system clock signal and the power supply voltage by the clock controllers shown in FIG. 1.

Subsequently, the control of the frequency of the clock signal and the power supply voltage by the clock controller 7 of FIG. 1 is described in detail with reference to a flow chart of FIG. 3.

The clock controller 7 first discriminates in step S1 whether or not a half empty flag is received from the FIFO memory 3. If it is discriminated that a half empty flag is received, that is, when the storage capacity of the FIFO memory 3 is not sufficiently used and the module 4 need not operate at a very high speed, the control advances to step S2, in which the frequency of the system clock signal to be outputted from the clock controller 7 is lowered by a predetermined frequency Δf. Thereafter, the voltage control circuit 9 is controlled so that the power supply voltage to be supplied to the module 4 is lowered by a predetermined voltage ΔE, whereafter the control advances to step S3.

On the other hand, if it is discriminated in step S1 that a half empty flag is not received, then the control skips step S2 and directly advances to step S3. In step S3, the clock controller 7 discriminates whether or not an almost full flag in received from the FIFO memory 3. If it is discriminated that an almost full flag is received, that is, when the storage capacity of the FIFO memory 3 is almost full and the module 4 must be caused to operate at a high speed, the control advances to step S4. In step S4, the voltage control circuit 9 is controlled so that the power supply voltage to be supplied to the module 4 is raised by the predetermined voltage ΔE and then the frequency of the system clock signal to be outputted from the voltage control circuit 9 is raised by the predetermined frequency Δf, whereafter the control returns to step S1.

On the other hand, if it is discriminated in step S3 that an almost full flag is not received from the FIFO memory 3, the control skips step S4 and returns to step S1.

Accordingly, when the FIFO memory 3 continues to output a half empty flag, the processing in steps Si to S3 is repeated. Consequently, the frequency of the system clock signal to be supplied to the module 4 successively lowers in units of the predetermined frequency Δf and the power supply voltage successively lowers in units of the predetermined voltage ΔE. On the other hand, when the FIFO memory 3 continues to output an almost full flag, the processing in steps S1, S3 and S4 is repeated. Consequently, the frequency of the system clock signal to be supplied to the module 4 successively rises in units of the predetermined frequency Δf and the power supply voltage continuously rises in units of the predetermined voltage ΔE.

Also the clock controller 8 controls the frequency of the system clock signal and the power supply voltage to be supplied to the module 6 in a similar manner.

Figure 4:
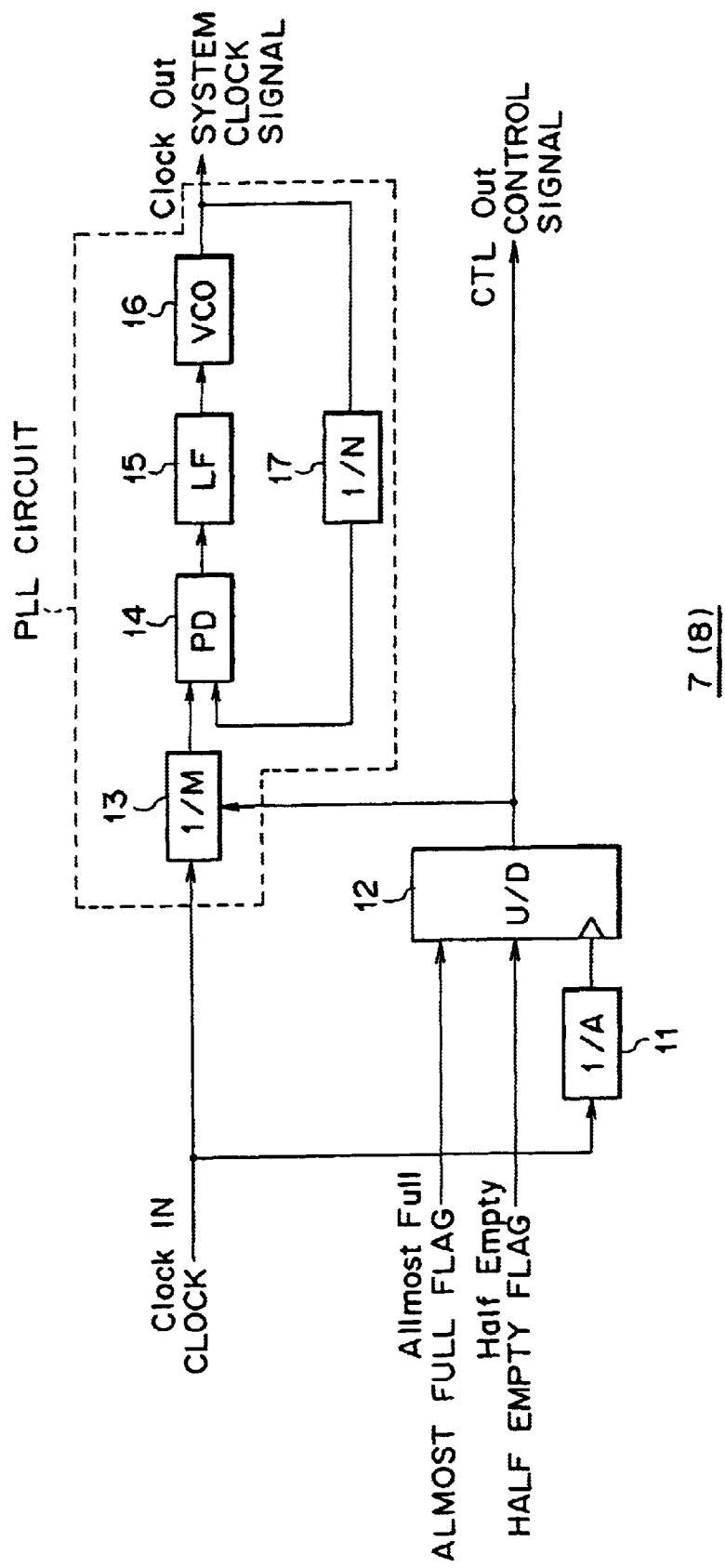
FIG. 4 is a block diagram showing an example of a construction of the clock controllers shown in FIG. 1.

FIG. 4 shows an example of a construction of the clock controller 7. Also the clock controller 8 has a similar construction to that of the clock controller 7.

The clock signal supplied from the clock generator 1 through the buffer 2 is supplied to a pair of dividers 11 and 13. The divider 11 divides the clock signal into 1/A (A is a positive integer) and outputs the divided clock signal to a clock terminal of a reversible (U/D) counter 12.

An almost full flag and a half empty flag are supplied to the reversible counter 12. When the reversible counter 12 receives an almost full flag or a half empty flag at a timing at which the output of the divider 11 is supplied to a clock terminal of the reversible counter 12, the reversible counter 12 increments or decrements its count value. The count value of the reversible counter 12 is supplied as a control signal to the divider 13 and the voltage control circuit 9.

Accordingly, the reversible counter 12 detects in a period equal to A times the period of the clock signal outputted from the clock generator 1 whether or not an almost full flag or a half empty flag is received. If it is detected that an almost full flag or a half empty flag is received, then the count value of the reversible counter 12 is decremented or incremented.

It is to be noted that, after the count value of the reversible counter 12 comes to zero, the reversible counter 12 maintains the count value 0 even if an almost full flag is received. Further, the count value has a predetermined upper limit, and after the upper limit value is reached, the count value of the reversible counter 12 remains equal to the upper limit value even if a half empty flag is received.

The voltage control circuit 9 of FIG. 1 controls the power supply voltage to be supplied to the module 4 in accordance with the control value as a control signal from the reversible counter 12. In particular, when the count value from the reversible counter 12 is high, the voltage control circuit 9 lowers the power supply voltage, but when the count value is low, the voltage control circuit 9 raises the power supply voltage.

The divider 13, a phase comparator (PD) 14, a loop filter (LF) 15, a voltage controlled oscillator (VCO) 16 and a divider 17 form a PLL (Phase Locked Loop) circuit. The divider 13 divides, where the count value from the reversible counter 12 is M, the clock signal inputted thereto into 1/M and supplies the divided clock signal to the phase comparator 14. Also an output of the divider 17 is supplied to the phase comparator 14. The phase comparator 14 detects a phase difference between the outputs of the dividers 13 and 17 and supplies it to the loop filter 15. The loop filter 15 removes high frequency components from the output of the phase comparator 14 and outputs a resulting signal to the voltage controlled oscillator 16. The voltage controlled oscillator 16 generates a voltage corresponding to the output of the loop filter 15 and outputs the voltage as a system clock signal. The voltage is outputted also to the divider 17. The divider 17 divides the output of the voltage controlled oscillator 16 into 1/N (N is a positive integer) and supplies a resulting signal to the phase comparator 14.

The PLL circuit having such a construction as described above outputs a clock signal of a frequency equal to N/M times that of the clock signal inputted thereto. Accordingly, the clock controller 7 outputs a clock signal of a frequency which is equal, when it is in the highest, to N (=N/1) times that of the clock signal inputted thereto. It is to be noted that, when the count value M supplied from the reversible counter 12 to the divider 13 is 0, the PLL circuit stops its operation. In this instance, no clock pulse is outputted from the clock controller 7.

As described above, by successively varying the frequency of the system clock signals and the power supply voltages, the power consumption of the modules 4 and 6 can be reduced when compared with that of a conventional semiconductor circuit.

Figure 6:
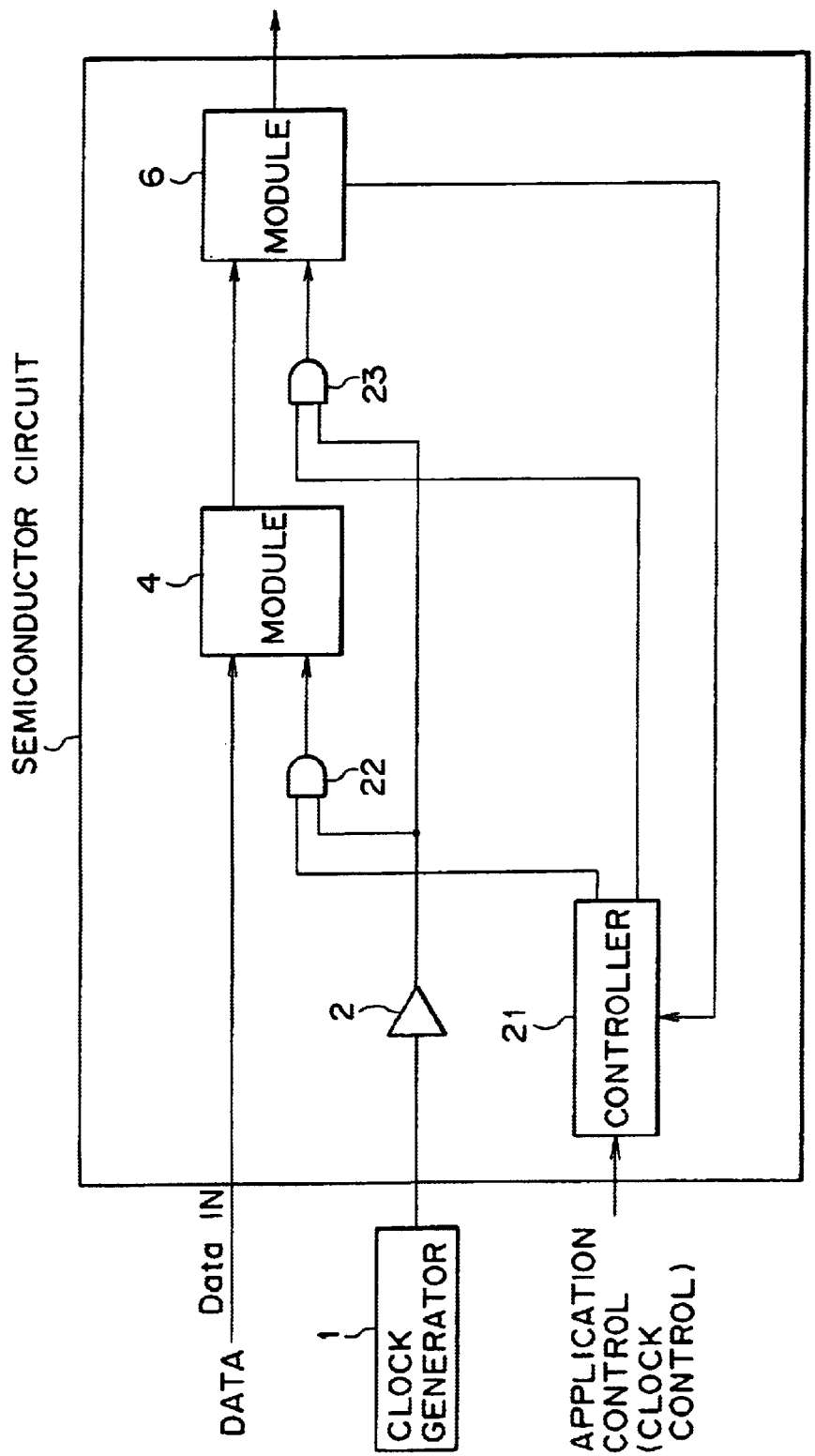
FIG. 6 is a block diagram showing a construction of an example of a conventional semiconductor circuit.

In particular, if it is assumed that, for example, the loads to the modules 4 and 6 gradually decrease, then in the semiconductor circuit shown in FIG. 6, the frequencies of the system clock signals to be supplied to the modules 4 and 6 do not vary until an instruction is received from the application even if the loads decrease as seen from FIG. 5A, but the supply of the system clock signals is stopped suddenly at a point of time when an instruction is received from the application. In contrast, with the semiconductor circuit of FIG. 1, as the loads decrease, also the frequencies of the system clock signals lower as seen from FIG. 5D.

Further, with the semiconductor circuit of FIG. 6, while the system clock signals are supplied to the modules 4 and 6, the predetermined power supply voltages are supplied to them, but when supply of the system clock signals is stopped, then the power supply voltage is lowered at a stroke.as seen from FIG. 5B. In contrast, with the semiconductor circuit of FIG. 1, each of the power supply voltages lowers together with the frequency of the system clock signal of FIG. 5D as seen from FIG. 5E.

As a result, the power consumption exhibits such variations as shown in FIGS. 5C and 5F because it increases in proportion to the square of the power supply voltage. In particular, with the semiconductor circuit of FIG. 6, while the predetermined power supply voltage is supplied, predetermined fixed power is consumed, and when supply of the power supply voltage is stopped, then the power consumption drops at a stroke. On the other hand, with the semiconductor circuit of FIG. 1, the power consumption lowers in proportion to the square of the power supply voltage.

Since the semiconductor circuit of FIG. 1 is constructed such that also the system clock signals to be supplied are varied together with the power supply voltages to be supplied to the modules 4 and 6, for example, if the power supply voltages drop to ½, then also the speeds of operation of the modules 4 and 6 drop to ½. Accordingly, also the amounts of work performed by the modules 4 and 6 is reduced to ½. However, since the power consumption increases in proportion to the square of the power supply voltage, it is reduced to ¼ (=½²). In other words, the power consumption with respect to the same work amount is reduced compared with an alternative case wherein the power supply voltages and the system clock signals are not varied.

It is to be noted that, with the semiconductor circuit of FIG. 6, since the AND gate 22 and 23 are inserted in the system clock system (clock net), it is necessary to route surplus wiring for delaying a clock signal, and skew control of the clock signals is difficult.

In order to suppress a skew without routing wiring for delay, the clock net must have an equal potential therein as much as possible. In this instance, also the power consumption of the clock net can be reduced. However, where a gate is provided for the clock net, it is difficult to make the entire clock net have an equal potential.

Further, in a semiconductor circuit of a large scale which includes a large number of modules, since a large capacity is required for the entire clock net, it in difficult to make the entire clock net have an equal potential, and routing of delaying wiring is required in order to suppress the skew. Further, in such a case that data processed by the semiconductor circuit are stored once into a register and then outputted, time is required to output data to the outside due to a delay of a clock signal.

In contrast, with the semiconductor circuit of FIG. 1, since no gate is provided for the clock net; the entire clock net can be controlled to an equal potential comparatively easily.

Further, in the semiconductor circuit of FIG. 1, since the clock signal outputted from the clock generator 1 is supplied only to the FIFO memory 3 and the clock controllers 7 and 8 through the buffer 2, the load to the buffer can be reduced and the skew of the clock signal can be made small. In particular, when it is tried to perform pipeline processing with a plurality of modules connected in series, a plurality of stages of flip-flops are sometimes provided in a stage preceding to each module to connect the modules to each other. In this instance, several tens thousand flip-flops are sometimes required for one chip, and this makes skew control very difficult. In contrast, where the FIFO memories 3 and 5 are provided in a stage preceding to the modules 4 and 6 to interconnect the modules 4 and 6 and the system clock signals are supplied from the clock controllers 7 and 8 to the modules 4 and 6, respectively, even if the number of modules increases, since it is usually estimated that the number of such modules is approximately several tens, the skew of clock signals can be suppressed small compared with the above-described case wherein clock signals are supplied to several tens thousand flip-flops.

While the embodiment wherein the present invention is applied to a semiconductor circuit of one chip is described above, a semiconductor circuit of the type described can be applied, for example, to a processor or a like circuit which processes graphics data, audio data and other data.

It is to be noted that, for the divider 11 shown in FIG. 4, for example, a loadable frequency divider which can read in a dividing ratio can be used so that the dividing ratio 1/A may be set in a programmable fashion from the outside. In this instance, the rate of the variation of the frequency of a system clock signal or the power supply voltage shown in FIG. 5D or 5E can be controlled from the outside.

Further, in the present embodiment, when an almost full flag or a half empty flag is received, the count value of the reversible counter 12 (FIG. 4) is incremented or decremented. However, it is otherwise possible, for example, to supply only a half empty flag to the reversible counter 12 and increment or decrement the count value of the reversible counter 12 when the half empty flag is received or not received.

Furthermore, in the present embodiment, a PLL circuit is built in the clock controller 7 (8) so that a system clock signal having a frequency higher than that of the clock signal generated from the clock generator 1 may be obtained. However, where it is not necessary to cause the modules 4 and 6 to operate with system clock signals having frequencies higher than that of the clock signal generated from the clock generator 1, the PLL circuit of FIG. 4 may be formed only from the divider 13 Further, in the present embodiment, the two modules 4 and 6 are provided in the semiconductor circuit (FIG. 1). However, the number of modules to be provided in the semiconductor circuit may be 1 or may be 3 or more.

Furthermore, in the present embodiment, the FIFO memory 3 or 5 is provided in a stage preceding to the module 4 or 6 in the semiconductor circuit. However, the semiconductor circuit may be formed otherwise without providing the FIFO memories 3 and 5. In this instance, however, processing states of the modules 4 and 6 must be detected by some means.

Further, generally a module can operate at a higher speed as the power supply voltage to it rises. Therefore, it is desirable to lower the power supply voltage after the frequency of the system clock signal is lowered and to raise the frequency of the system clock signal after the power supply voltage is raised.

While a preferred embodiment of the present invention has been described using specific terms, such description is for illustrative purposes only, and it is to be understood that changes and variations may be made without departing from the spirit or scope of the following claims.

What is claimed is:

1. A power consumption controlling circuit for controlling (1) a power consumption of a first module which performs predetermined processing in synchronism with a first clock signal and (2) a power consumption of a second module which performs predetermined processing in synchronism with a second clock signal, comprising:

a first storage unit in a stage preceding said first module, said first storage unit for storing data to be processed by said first module and reading data out in accordance with the first clock signal;

first detection means for detecting a processing state of said first module based on an amount of data stored in said first storage unit;

first control means for varying the frequency of the first clock signal and/or a first power voltage supplied to said first module in response to a result of the detection of said detection means;

a second storage unit in a stage preceding said second module, said second storage unit for storing data to be processed by said second module in accordance with the first clock signal and reading data out in accordance with the second clock signal;

second detection means for detecting a processing state of said second module based on an amount of data stored in said second storage unit; and second control means for varying the frequency of the second clock signal and/or a second power voltage supplied to said second module in response to a result of the detection of said detection means.

2. The power consumption controlling circuit according to claim 1, wherein, when the first power voltage is to be lowered, said first control means first lowers the frequency of the first clock signal and then varies the first power voltage, but when the frequency of the first clock signal is to be raised, said first control means first raises the first power voltage and then varies the frequency of the first clock signal.

3. The power consumption controlling circuit according to claim 1, wherein said first detection means includes counting means for incrementing or decrementing a count value thereof in response to an amount of data stored in said first storage unit and detects the processing state of said first module based on the count value of said counting means.

4. The power consumption controlling circuit according to claim 3, further comprising a phase locked loop circuit which operates in synchronism with the first clock signal, said control means varying a dividing ratio of said PLL circuit in accordance with the count value of said counting means to vary the frequency of the first clock signal.

5. A power consumption controlling method for controlling (1) a power consumption of a first module which performs predetermined processing in synchronism with a first clock signal, and (2) a power consumption of a second module which performs predetermined processing in synchronization with a second clock signal comprising the steps of:

storing data to be processed by said first module in a first storage unit preceding said first module;

reading data out of said first storage unit in accordance with the first clock signal;

detecting a processing state of said first module based on an amount of data stored in said first storage unit;

varying the frequency of the first clock signal and/or a first power voltage supplied to said first module in response to a result of the detection of the processing state of said first module;

storing data to be processed by said second module in a second storage unit in accordance with the first clock signal, said second storage unit preceding said second module;

reading data out of said second storage unit in accordance with the second clock signal;

detecting a processing state of said second module based on an amount of data stored in said second storage unit; and varying the frequency of the second clock signal and/or a second power voltage supplied to said second module in response to a result of the detection of the processing state of said second module.

6. The power consumption controlling circuit according to claim 1, wherein, when the second power voltage is to be lowered, said second control means second lowers the frequency of the second clock signal and then varies the second power voltage, but when the frequency of the second clock signal is to be raised, said second control means second raises the second power voltage and then varies the frequency of the second clock signal.

7. The power consumption controlling circuit according to claim 1, wherein said second detection means includes counting means for incrementing or decrementing a count value thereof in response to an amount of data stored in said second storage unit and detects the processing state of said second module based on the count value of said counting means.

8. The power consumption controlling circuit according to claim 7, further comprising a phase locked loop circuit which operates in synchronism with the second clock signal, said control means varying a dividing ratio of said PLL circuit in accordance with the count value of said counting means to vary the frequency of the second clock signal.

9. A power consumption controlling circuit according to claim 1, wherein both of said first and second clock signals are derived from a system clock.

* * * * *

UNITED STATES PATENT AND TRADEMARK OFFICE
CERTIFICATE OF CORRECTION

PATENT NO. : 6,647,502 B1 Page 1 of 1
DATED : November 11, 2003
INVENTOR(S) : Mutsuhiro Ohmori It is certified that error appears in the above-identified patent and that said Letters Patent is hereby corrected as shown below:

<u>Column 8,</u>
Line 61, after "13", add -- . -- (a period), and start a new paragraph with "Further, in the...".

Signed and Sealed this

Thirteenth Day of January, 2004

JON W. DUDAS
*Acting Director of the United States Patent and Trademark Office*